March 5, 1968
W. J. KUDLATY ETAL
3,371,790
MAGNETIC FILTER
Filed Jan. 13, 1965
3 Sheets-Sheet 1
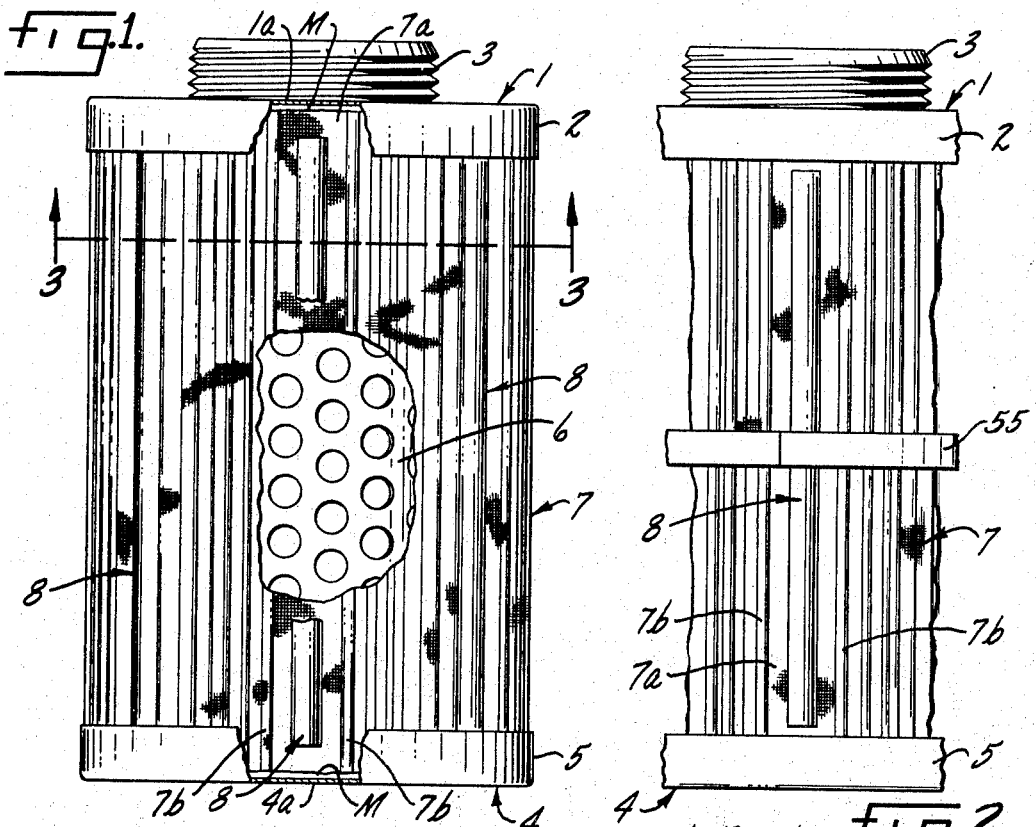
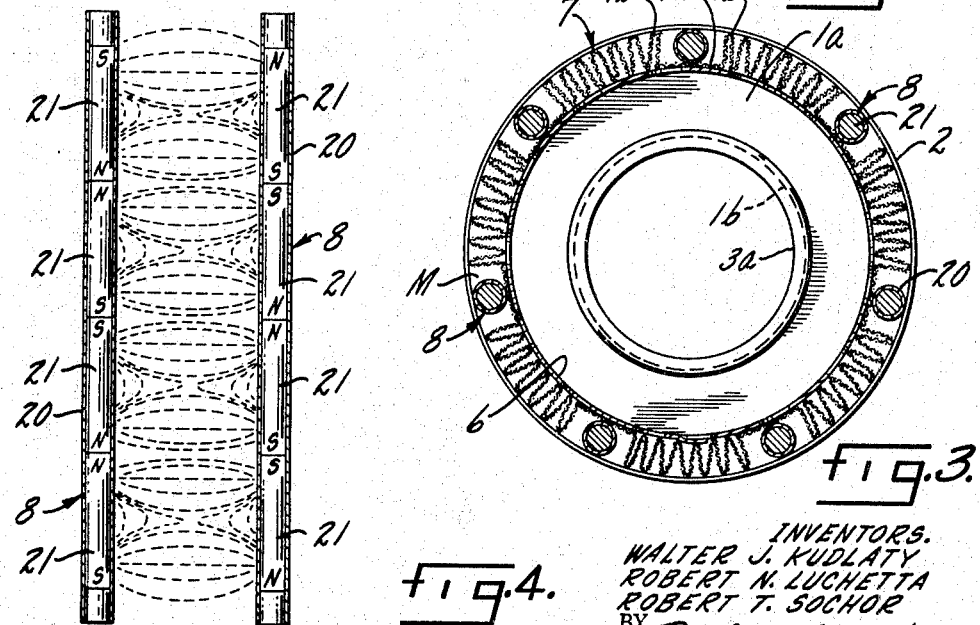
INVENTORS.
WALTER J. KUDLATY
ROBERT N. LUCHETTA
ROBERT T. SOCHOR
BY *Parker & Carter*
*Attorneys.*

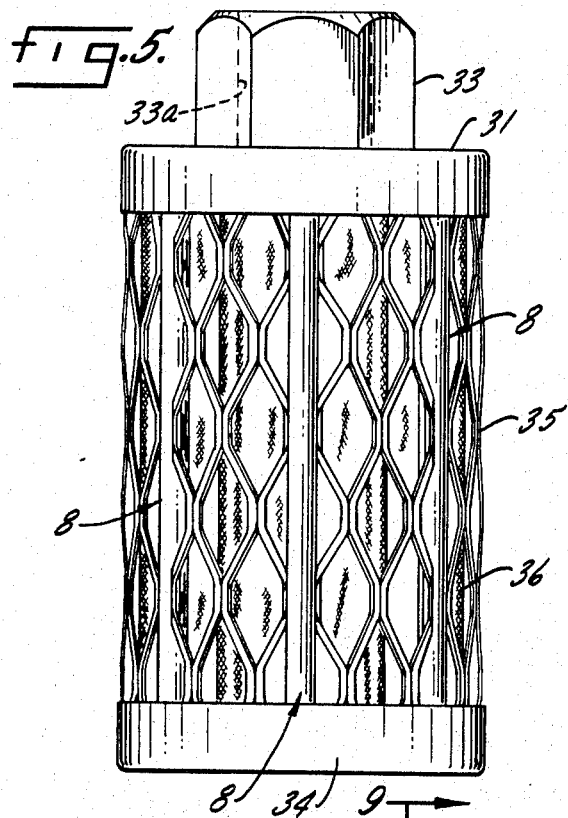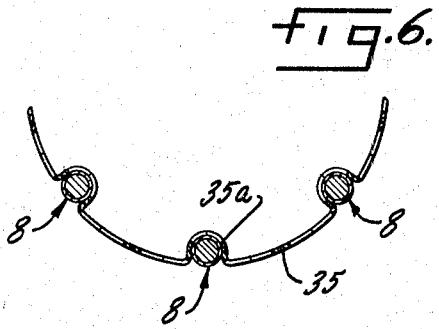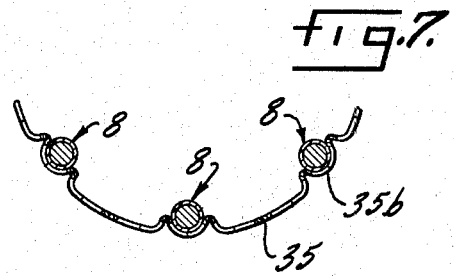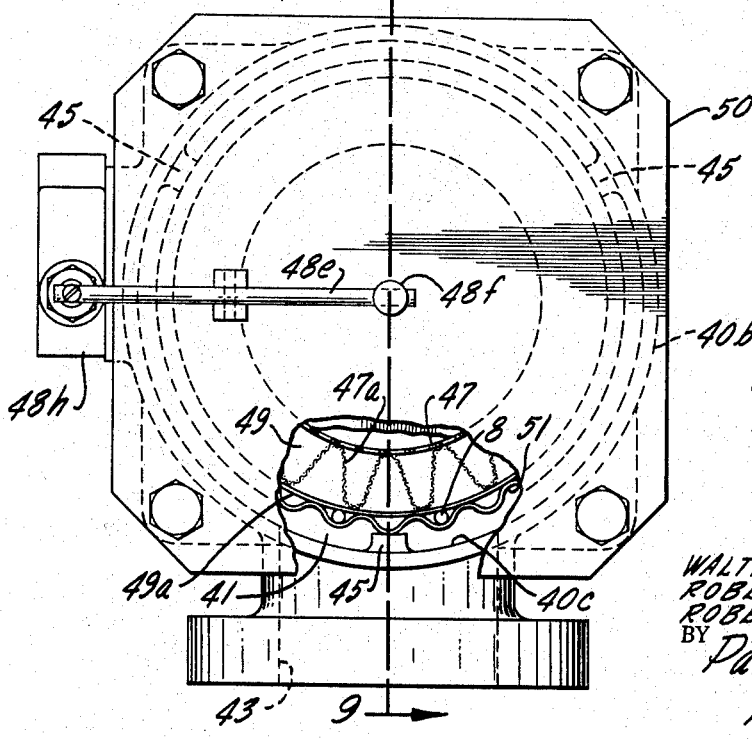

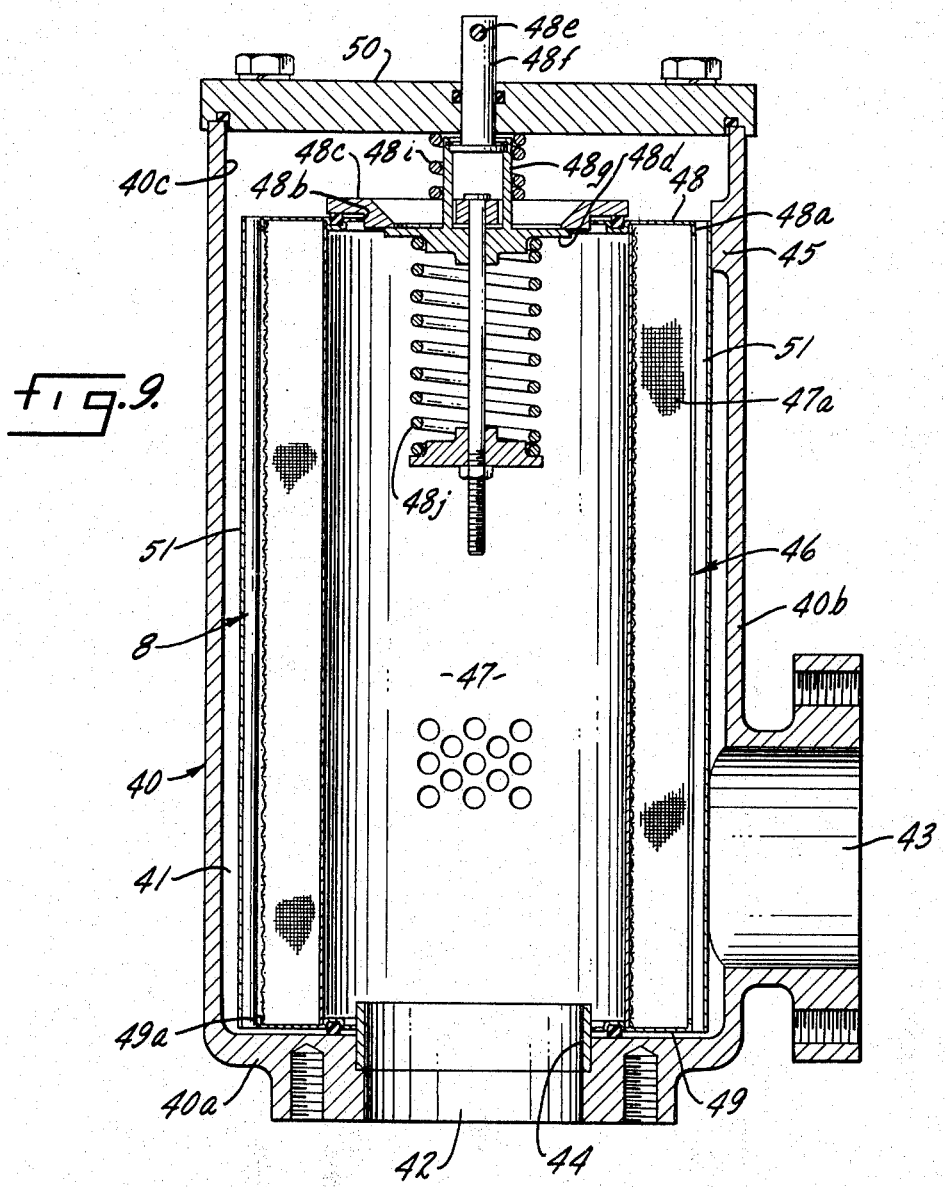

United States Patent Office 3,371,790
Patented Mar. 5, 1968

3,371,790
MAGNETIC FILTER
Walter J. Kudlaty, Elmhurst, Robert N. Luchetta, Bensenville, and Robert T. Sochor, Berwyn, Ill., assignors to Marvel Engineering Company, Chicago, Ill., a corporation of Illinois
Filed Jan. 13, 1965, Ser. No. 425,207
4 Claims. (Cl. 210—223)

This invention relates to filters and has particular relation to filters having magnetic attraction capability.

One purpose of the invention is to provide a filter having means for attracting and holding materials subject to magnetic attraction.

Another purpose is to provide a filter structure including easily insertable and removable magnetic elements.

Another purpose is to provide a filter structure having a filter media designed for maximum effectiveness in association with magnetic elements.

Another purpose is to provide a combination of filter media and magnetic elements particularly effective to produce separation of magnetically attractable materials from the fluid being filtered.

Another purpose is to provide a combination filter and magnetic element structure of maximum economy in manufacture and use.

Another purpose is to provide a magnetic filter having a magnetic field of maximum coverage and a filtering area of maximum dimensions.

Another purpose is to provide a filter and magnetic element structure of maximum simplicity in use and operation.

Past efforts to provide for removal of metal filings or particles and other deleterious, magnetically attractable materials from fluid to be filtered have in some instances employed the placing of a magnet, or series of spaced magnet elements, within the central core of a filter with the intent of removing such magnetically attractable materials from the fluid after the same has passed through the filtering media or screen. The theory behind such concept appears to lie in the view that magnetically attractable deleterious particles thus caught on a magnet so positioned will necessarily have been of such fineness as to have passed through the interstices of the filtering media, larger particles being trapped by the filtering media itself. Thus it was apparently thought that magnetically attractable particles which might escape being caught on such magnetic member or which might flake off from such magnetic member would present a relatively minor problem to the machinery with which the fluid being filtered is directed for use. However, such particles build up on magnet members located in the downstream flow of fluid and tend to break loose in clusters or plugs capable of producing serious injury to the machinery for which the fluid is being filtered. Accordingly, it is one purpose of the invention to provide a magnetic filter effective to separate magnetically attractable deleterious materials from the fluid being filtered prior to the passage of the fluid through the filter media and to preclude the delivery of such clusters or plugs of such deleterious material beyond the filter.

Another purpose is to provide a magnetic filter assembly wherein magnetic members are included without increasing the envelope or area occupied by prior filter elements.

Another purpose is to provide a filter element having a magnetic field entirely enveloping the filter media and filtering area thereof.

Another purpose is to provide a magnetic member for filters and the like.

Another purpose is to provide a magnetic member of a particular construction effective to create a magnetic field of maximum coverage.

Another purpose is to provide a magnet member having a substantially uniform attraction along its entire length.

Another purpose is to provide a magnetic filter having a maximum collection and storage area for deleterious magnetically attractable materials.

Another purpose is to provide a magnetic filter having means for insuring a maximum use period between cleanings.

Another purpose is to provide a magnetic filter having filtering areas maintained free of deleterious magnetically attractable deposits for maximum periods of time.

Another purpose is to provide means for converting a standard to a magnetic filter.

Another purpose is to provide magnetic accessory means effective to convert a nonmagnetic filter element into a magnetic filter element.

Other purposes will appear from time to time during the course of the specification and claims.

The invention is illustrated more or less diagrammatically in the accompanying drawings, wherein:

FIGURE 1 is a side elevation with parts broken away;

FIGURE 2 is a partial side view of a variant form of the structure of FIGURE 1;

FIGURE 3 is a sectional view taken on the line 3—3 of FIGURE 1;

FIGURE 4 is a detail view illustrating elements of the invention;

FIGURE 5 is a view similar to that of FIGURE 1 and illustrating a differing version of the invention;

FIGURE 6 is a detail view, in partial cross section, of a part of FIGURE 5;

FIGURE 7 is a view similar to that of FIGURE 6 and illustrating a varying arrangement;

FIGURE 8 is an end view of a variant form of the invention with parts broken away; and FIGURE 9 is an axial half section on the line 9—9 of FIGURE 8.

Like parts are indicated by like numerals throughout the specification and drawings.

Referring now to the drawings, and particularly to FIGURES 1 and 3, it will be observed that the filter of the invention includes an end cap 1 having a wall 1a and a circumferential skirt or annular flange 2. A fitting member 3 is provided for cap 1 and has a central bore 3a therethrough. A second end cap 4, having a wall 4a and a skirt or annular flange 5, is spaced from cap 1. A central, hollow core 6 is formed of perforated, magnetically attractable material such as steel, for example, and extends between the caps 1, 4, the area within core 6 being in communication with bore 3a through a suitable opening 1b in wall 1a.

Surrounding the outer surface of core 6 is a filter element or screen 7 formed of fine mesh, nonmagnetically attractable material and arranged conveniently in corrugated or pleated planar configuration, as may be best seen, for example, in FIGURE 3. A layer of bonding material M is shown in FIGURE 1 against the inner surface of walls 1a and 4a in engagement with the opposite ends of screen 7.

A plurality of magnet members 8 are positioned in circumferentially spaced relationship about the filter of the invention. The magnetic members 8 are preferably elongated, cylindrical and comparatively thin or of pencil-like configuration. Each of the members 8, as shown in FIGURES 1 and 2, is positioned in the lowermost position of one of the valleys 7a and between two adjacent ridges 7b formed in the member 7. As illustrated best in FIGURE 3, the particular valleys in which a member 8 is to be positioned have a substantially wider base or bottom wall and their side walls divergent at an angle greater than the divergent angle of, or spaced apart a distance greater than, the side walls of the other valleys formed in the member 7. The valleys or spaces 7a may be conveniently formed, for example, by skipping a suitable distance at predetermined points in the process of forming the pleated screening surface 7.

As illustrated in FIGURE 1, the members 8 are conveniently formed of a length somewhat greater than the space between the opposed edges of the skirts or flanges 2, 5 but of a length less than the space between a layer of material M and the edge of the opposed skirt. Hence the members 8 may be easily placed and removed manually in the original construction of the filter and on the occasions when the magnetic members 8 are to be removed for cleaning of deleterious magnetic materials caught thereon.

Referring now to FIGURE 4, it will be observed that each of the magnetic members 8 is formed of a hollow, cylindrical tube 20. The cylindrical wall of the tube 20 is of maximum thinness consistent with required strength and wear capacity being of the order of ten-thousandths of an inch, for example. The tube 20 is formed of a material, aluminum having been found satisfactory, effective to pass or transmit the magnetism of a plurality of individual magnets 21 positioned thereon. While the number of cylindrical, permanent magnets 21 positioned within each of the tubes 20 may vary, FIGURE 4 illustrates the placement of four such individual magnets in each of the tubes 20 therein illustrated.

Indica has been inserted in FIGURE 4 to illustrate the polarity of the magnets 21. It will be observed that the individual magnets are reversed in polarity within each of the tubes 20 so that adjacent end portions of each set of two magnets are of the same, and therefore opposing, polarity. With this arrangement it has been found that fields or areas of magnetism, as illustrated more or less schematically in FIGURE 4, are forced outwardly and the magnet members 8 can be spaced apart a substantial distance while continuing to provide full-coverage fields of magnetism therebetween. Thus, a filtering area of maximum width is provided between each pair of magnet members 8 while insuring that magnetically attractable deleterious particles entering anywhere between said members will be drawn to one or the other thereof.

Since the described and illustrated arrangement of the magnets 21 produces resistance to the juxtaposition thereof within the members 20, it will be realized that the members 21 are placed in the member 20 and are forced together into the position shown. The ends of the tubes 20 are closed in any suitable manner to hold members 21 in desired position against the separating effect of the opposed polarity of members 21. The ends of tubes 20 may be pinched together or suitable plugs may be inserted and secured within the otherwise open ends of members 20 to hold the magnets 21 in contact with each other as illustrated. The employment of a plurality of relatively short permanent magnets in each member 8, as discussed more fully below, is effective to produce a field of magnetic flux constituting a filtering area for magnetically attractable materials present in the fluid to be filtered. The production of a magnetic field of maximum lateral extent provides for maximum spacing between the members 8, produces a total envelopment of the filter media by a total field of magnetic force, reduces the number of members 8 required with any given filter assembly and provides a maximum clear filtering area and a resulting increase in operating time between required cleanings.

Referring to FIGURES 5-7, the employment of magnet elements 8 is illustrated in combination with a differing form of filter structure. As shown in FIGURE 5, the filter structure itself has a set of end caps 31, 34 and a fitting 33 with bore 33a. A sleeve 35 of expanded metal extends between caps 31, 34. Within the sleeve 35 a suitable filter screen or filter media 36 is positioned. It will be understood that the area encompassed by the filter media 6 is in communication with the outlet bore 33a. The members 8 are magnetically attracted to and held against the sleeve of expanded metal sleeve 35, the material thereof being magnetically attractable. As illustrated in FIGURE 6, the sleeve 35 conveniently has a plurality of outwardly open, circumferentially spaced, axially parallel grooves or recesses 35a formed therein. The members 8 are positioned within the recesses 35a and thus the total structure remains within the envelope or area occupied by the same type of filter in its nonmagnetic configuration.

Referring to FIGURE 7, it will be observed that the member 35 has formed therein a number of axially parallel, circumferentially spaced, inwardly open grooves 35b in which magnet members 8 are positioned. In this configuration the area or envelope established for the filter element of the type illustrated in FIGURE 5 is also maintained and the members 8 are conveniently held therewithin. It will be clear that the design of FIGURE 6 provides for easier removal and replacement of the members 8 than that of FIGURE 7.

Referrring now to FIGURES 8 and 9, there is illustrated a filter housing 40. The housing 40 has an elongated, cylindrical chamber 41 therein. An outlet 42 is formed centrally in an end wall 40a of housing 40 and an inlet 43 is formed in the cylindrical wall 40b of housing 40. A pilot sleeve 44 is secured at outlet 42 and extends inwardly into chamber 41. A plurality of circumferentially spaced pilot ribs 45 are formed on the inner surface of cylindrical wall 40b. A filter element 46 includes a central, hollow, tubular core 47 of perforated material. A suitable filter media or screen element 47a surrounds the core 47. A pair of end caps 48, 49 are attached to the opposite ends of core 47 and filter media 47a. End cap 48 has an annular skirt or peripheral flange 48a and end cap 49 has a similar skirt or flange 49a, the flanges 48a, 49a being directed toward each other. It will be observed that the sleeve 44 is dimensioned to fit within an end of core 47 and to serve thereby as a pilot for positioning the filter element 46 centrally in chamber 41. Filter element 46 is inserted into housing through its open end 40c for which a closure cap 50 is provided.

End cap 48 has a central aperture 48b formed therein for communication with the area within core 47 and a suitable by-pass valve seat plate 48c is yieldingly urged by spring 48i against said central aperture for sealing the same against the passage of fluid to be filtered until a predetermined pressure is reached within chamber 41 externally of filter 46, whereupon by-pass valve member 48d will open to permit by-passing of the filter media 47a and to direct the flow of fluid from chamber 41 through core 47 and outwardly through outlet 42. A signal arm 48e is pivoted externally of cap 50 and actuated by valve 48d through a shaft 48f attached by fingers 48g to the valve and extending through cap 50. Arm 48e actuates switch assembly 48h to signal the condition of the filter and/or to shut down machinery served by the filter. Spring 48i urges filter element 46 in position and positions the by-pass assembly. Spring 48j urges valve 48d toward closed position.

An elongated tubular sleeve 51 is dimensioned to slide over and receive the filter 46 and end caps 48, 49. The sleeve 51 is formed of mesh or perforated material and is corrugated as shown best in the cross-sectional view of FIGURE 9. Circumferentially spaced about the filter 46 and within sleeve 51 is a plurality of magnet members 8. It will be observed that the magnet members 8 are of sufficient linear extension to produce contact between their opposite end portions and the external surface of skirts 48a, 49a. While a plurality of corrugations are illustrated as formed in sleeve 51 and while the members 8 are positioned in spaced corrugations, it will be realized that the sleeve 51 could be provided with a number of spaced corrugations sufficient only to receive the desired number of magnet members 8 without departing from the nature and scope of the invention. Since the sleeve 51 is formed of a mesh or perforated material, it will be realized also that the same is serviceable as an additional filter media. For example, the interstices or openings in the sleeve 51 could be of a dimension greater than those in the screen or filter media 47a, thus providing a dual-stage filtration of the fluid enroute from chamber 41 to core 47 and outlet 42. The sleeve 51, and thus the filter 46, is piloted by ridges 45.

Illustrated in FIGURE 2, as a further example, is a further example, is a clamping band 55 which encircles the filter element 7 and magnetic rods 8 to retain the same against accidental escape when the filter element of the invention is inserted, removed from and reinserted in the filter housing for inspection, cleaning, etc. In those instances in which the rods 8 are not subject to mechanical retention by overlap with the skirts 2 and 5, it is possible, during such handling of the filter element outside a filter housing, for the rods 8 to contact various metal structures and to be drawn away from the element 7. The band 55 effectively prevents such result. While a simple band 55 is illustrated, it will be realized that the form of retaining means may vary including, for example, such structure as a coil of thin wire and individual clips engaging each rod and its associated valley 7a without departing from the nature and scope of the invention. The band 55, which in its free state has substantial portions of its ends in overlapping relationship and which in use has its ends abutting or very slightly overlapped, provides a satisfactory embodiment of a retention means. Each of the retention means mentioned fits within the envelope of the total structure shown in FIGURES 1 and 2.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, the members 8 may be employed in association with filtering structures of varying configurations without departing from the nature and scope of the inventions herein.

The use and operation of the invention are as follows:

It will be understood that fluid to be filtered flows from the area about the filler shown in FIGURE 1 through the mesh layer 7 of nonmagnetic material, thence through the perforations in core 6 and thence outwardly through bore 3a. Magnetically attractable materials, such as metal filings and the like, in the fluid to be filtered are forced into the enveloping magnetic field about the filter and are drawn directly to one of the members 8, there being no blank or dead areas through which such materials can escape. Such materials are thus caught on the members 8 prior to the passage of the fluid to be filtered into the core 6 and delivery thereof through the bore 3a toward a point of use. The wide spaces or valleys 7a provide substantial collection areas or storage spaces for the material caught by magnet members 8 and effectively maintain a major portion of screen 7, composed of the areas between members 8, clear for continued filtering for long periods prior to or between cleanings. Members 8 are readily removable from the filter of the invention for cleaning and replacement. Such removal is effected manually with ease.

While the members 8 are shown as seated in or aligned with the bottom portions of wider valleys or valleys having side walls of greater divergence or spaced apart a distance greater than remaining valleys in the member 7, it will be understood that this is a preferred form providing for reception of a comparatively large body of magnetically attractable deleterious materials. The members 8 may be positioned in valleys substantially identical with remaining valleys without departing from the nature and scope of the inventions herein. Similarly, it will be understood that the members 8, as shown in FIGURES 1–3, are held in magnetically attracted relationship with the material of core 6 through the interstices or open spaces in the mesh of the material 7, said material being of fine mesh and thin cross section. It will be further understood that while the core 6 is shown as tubular or circular in cross section, it may take a variety of cross-sectional configurations and may, in fact, be pleated as is the member 7, the filtering element thus comprising a pleated mesh layer and a pleated, perforated, magnetically attractable core layer in laminated relationship. In such latter event, the members 8 may be positioned in magnetically attracted relationship with the perforated layer at convenient, spaced positions in the pleats of such layers. Moreover, while the members 8 are shown in FIGURE 1 as being of sufficient linear extension to provide both a magnetically attracted relationship with the core 6 and an overlapping interpenetration with the skirts 2 and 5 of caps 1 and 4, respectively, it is possible that, in particular installations, as appears in FIGURE 2, the magnetically attracted relationship of the core 6 and members 8 may be relied upon for retention of members 8 in the desired position and, in such event, the members 8 could be of shorter extension, as shown. It will be further understood, as illustrated in the broken portions of FIGURE 1, that filters of the general form there shown may have material M in caps 1 and 4 serving as a bonding agent and that the magnetic members 8 may have their end portions in spaced relationship with the layers of material M to provide for sliding members 8 in either direction to expose an end portion thereof for removal from between the skirts 2, 5.

The employment of tubes 20 with a plurality of individual cylindrical magnets 21 therein provides for simplified construction of magnet members 8 of varying lengths as desired. The arrangement of members 21 illustrated in FIGURE 4 is effective to provide fields of magnetism on opposite sides of the tubes 20 of maximum extension, and thus to provide a filter area of maximum width between magnets, said filter area being maintained free of magnetically attractable deleterious particles and the life of the filter between cleanings being extended thereby. The provision of individual permanent magnets 21, whether arranged in opposing or attracting interrelationship, provides a substantially uniform field of magnetic attraction throughout the length of the member 8, and avoids the weakened center of a single magnet of a length such as that of tube 20.

It will be seen from FIGURES 5–7 that the magnet members 8 may be conveniently employed with filters in which an expanded metal sleeve, such as the sleeve 35 of magnetically attractable material, surrounds a filter surface 36. The indentations or longitudinal grooves formed in the sleeve 35 provide for employment of members 8 without increasing the envelope or area occupied by the standard filter so constructed. It will be realized, when the maintenance of said area is not required, the magnet members 8 may be magnetically held against the outer surface of a cylindrical sleeve 35.

The sleeve 51 and magnet members 8 illustrated in FIGURES 8 and 9 provide a conversion accessory for filters of more or less standard construction. While the same require a slight enlargement of the area occupied by the total filter element, such area is, in fact, conventionally available within filter housings. Since the magnet members 8 of FIGURES 8 and 9 are of sufficient linear extension to bridge the end caps 48, 49, it will be clear that the nature or shape of the filter media 47a may vary substantially without effect upon the function of the magnet members 8. The sleeves 51 and magnet members 8 are easily removed by merely sliding the sleeve 51 from the filter 46 and thereafter removing the magnet members 8 for cleaning. Similarly, the sleeve 51 is then reinserted over the filter 46 and the magnet members 8 placed in the corrugations of sleeve 51 in reassembly.

The retention means for the shorter rods 8, such as shown in FIGURE 2, are likewise easily insertable or removable by hand. The band 55 is merely spread to pass about the members 8 and the member 7 and released to spring into the clamping position shown.

As is well known, the inlet and outlet areas of a filter assembly are related to the filtering element or screen of such assembly in such manner as to produce a greatly diminished flow or velocity of the fluid to be filtered as it moves from the inlet to the filter element or screen. Similarly, a filter screen produces a pressure loss which increases as the screen fills with contaminant. As the filter element openings clog, the rate of pressure loss increases rapidly, the major portion of such loss occuring in the last 25 percent of the life of the screen from clean to a level of contamination requiring replacement. These factors form part of the background of the magnetic filter invention as appears herein below.

Ferrous, magnetically attractable particles are generated by the wear of machinery and in turn are damaging thereto. The minutest particle can produce damage and downtime in modern precision machinery. To insure filtering of such minute, as well as larger, particles, the invention makes it possible to provide a filtering area of magnetic fields which, as discussed above, is large enough to filter the fluid as it moves through the low velocity portion of its travel and to do so in such manner as to preserve large filter screen areas against clogging and thus to extend the useful life of the filter screen.

In accomplishing this objective the use of elongated bar magnets, producing lines of magnetic forces which repel each other and never cross paths, would result in poor area coverage in the region of the bar mid-section. Considering the object of a magnetic filtering area or screen, therefore, such bar magnets would leave unacceptable large holes in such a screen. Accordingly, a feature of the invention is the achievement of maximum magnetic field area coverage by a spreading of the magnetic field produced by individual, elongated magnetic members.

The individual permanent magnets illustrated and described herein have a special ability to attract ferrous particles of all sizes without regard to size. A magnetic screen produced by such magnets is most effective in attracting small particles capable of passing through the mechanical or filter screen and will thus trap particles which would otherwise pass through the screen. It has been found preferable to form the permanent magnets 21 of Alnico, though they may be formed of a ferrite material without departing from the nature and scope of the invention.

As shown in FIGURE 4, the lines of magnetic force or flux leaving a pole of the individual magnet 21 will spread out through space, repelling each other, but will then close the loop and return to the opposite pole. While the adjacent poles of adjacent magnets 21, having the same polarity, are shown in FIGURE 4 as in contact each with the other, it has been found effective, also, to permit the intermediate magnets between those at the opposite ends of member 8 to "float" therebetween, a spacing of less than 4 cm. being preferable. Similarly, while four individual magnets 21 are shown within each member 8 in FIGURE 4, it will be understood that the number of magnets 21 may vary. The lines of force or magnetic flux illustrated more or less schematically in FIGURE 4 relate to the arrangement shown, wherein attracting poles are positioned in circumferential alignment about the filter media. It will be further understood, however, that an adequate magnetic screen can be achieved by a plurality of members 8 having identical or repelling poles circumferentially aligned but with adjacent poles identical or repelling within member 8 as shown.

The magnetic field achieved by the invention thus overlies or encompasses virtually the entire filtering surface and extends out into space to intercept and acquire ferrous particles as they approach the filtering surface in the low-velocity portion of the fluid flow though the filter assembly. Since ferrous particles are thus steered away from the large screen areas between member 8, such areas accumulate less contaminants and the service life of the screen is extended.

There is claimed:

1. In combination in magnetic filter, a pair of generally circular end structures axially aligned with one another which between them define a maximum diametric filter area; a filter screen of nonmagnetic material extending peripherally about the filter area, said filter screen being circumentially pleated to thereby provide alternate peaks and valleys, certain of said valleys being relatively wider than the remainder of the valleys and circumferentially spaced to define magnet receiving pockets, the external contour of the filter element as defined by the peaks being substantially axially coincident with the filter area; a magnetically attractable internal element located within the internal contour of the filter element as defined by the valleys; a plurality of rod-like magnet members seated within said pockets and having a length less than the longitudinal extent of the filter element to permit of axial movement thereof in said pockets; each of said magnet members being held primarily within its pocket by magnetic attraction to the internal element, each of said magnet members being manually removable from the remaining structure for cleaning purposes.

2. A magnetic filter as defined in claim 1 wherein said circular end structures are provided with peripheral annular flanges extending toward one another and said magnetic members are of such a length as to enable their ends to be disposed behind said flanges during use, but to permit removal of one end from beneath one of said flanges upon manual movement toward the opposite end structure.

3. A magnetic filter as defined in claim 2 wherein said magnet members are comprised of hollow tubes and each tube contains a plurality of individual cylindrical magnetic elements.

4. A filter comprising a pair of end caps, a hollow, perforated core formed of magnetically-attractable material and extending axially between said caps, a filter element formed of nonmagnetically-attractable mesh material and arranged in pleated valleys and ridges about said core and between said caps, the filter element material in the bottom portions of said valleys being in contact with said core, and a plurality of thin, pencil-like magnet members circumferentially spaced about and upon said filter element and in magnetically-attracted relationship with said core, said magnet members being positioned each in and on a bottom portion of one of said valleys, the valleys in which one of said magnet members is positioned having a greater width than that of adjacent valleys, said magnet members having a length less than the longitudinal extension of said filter element whereby said magnet members may be moved toward one of said end caps to expose one end of said magnet members from the other of said end caps, each said magnet member comprising an elongated hollow tube, a plurality of individual cylindrical magnets within said tube, the opposite ends of said tube being closed to retain said individual magnets therein, said individual magnets having their polarities in magnetically opposing relationship whereby the area of magnetism produced thereby is expanded, the poles of said individual magnets within each of said tubes being circumferentially aligned with the poles of individual magnets within adjacent tubes and being opposite.

References Cited

UNITED STATES PATENTS

| 2,149,764 | 3/1939 | Frei | 210—223 |
|---|---|---|---|
| 2,789,655 | 4/1957 | Michael et al. | 210—223 X |
| 2,800,230 | 7/1957 | Thomas | 210—223 |
| 2,825,464 | 3/1958 | Mack | 210—223 X |
| 2,838,179 | 6/1958 | Thomas | 210—223 |
| 3,035,703 | 5/1962 | Pall | 210—223 |
| 3,279,607 | 10/1966 | Michaelson | 210—223 |

SAMIH N. ZAHARNA, *Primary Examiner.*

REUBEN FRIEDMAN, *Examiner.*

F. MEDLEY, *Assistant Examiner.*